(12) United States Patent
Wilson et al.

(10) Patent No.: US 9,364,990 B2
(45) Date of Patent: Jun. 14, 2016

(54) CONTAINER FORMED VIA PLURAL BLOW MOLDING

(71) Applicant: Amcor Limited, Hawthorn, Victoria (AU)

(72) Inventors: Bradley Wilson, Manchester, MI (US); Peter Bates, Chelsea, MI (US); Frederick C. Beuerle, Jackson, MI (US); George David Lisch, Jackson, MI (US); Richard Steih, Jackson, MI (US)

(73) Assignee: Amcor Limited, Victoria (AU)

( * ) Notice: Subject to any disclaimer, the term of this patent is extended or adjusted under 35 U.S.C. 154(b) by 78 days.

(21) Appl. No.: 14/358,143

(22) PCT Filed: Nov. 13, 2012

(86) PCT No.: PCT/US2012/064785
§ 371 (c)(1),
(2) Date: May 14, 2014

(87) PCT Pub. No.: WO2013/074500
PCT Pub. Date: May 23, 2013

(65) Prior Publication Data
US 2014/0312537 A1    Oct. 23, 2014

Related U.S. Application Data

(60) Provisional application No. 61/560,110, filed on Nov. 15, 2011.

(51) Int. Cl.
*B29C 49/18*    (2006.01)
*B29C 49/28*    (2006.01)
(Continued)

(52) U.S. Cl.
CPC ............ *B29C 49/28* (2013.01); *B29C 49/12* (2013.01); *B29C 49/185* (2013.01); *B29B 11/06* (2013.01);
(Continued)

(58) Field of Classification Search
None
See application file for complete search history.

(56) References Cited

U.S. PATENT DOCUMENTS 4,047,874 A   9/1977   Valyi
4,057,609 A   11/1977  Uhlig
(Continued)

FOREIGN PATENT DOCUMENTS

DE   2537185 A1   3/1976
EP   1510325 A1   3/2005
(Continued)

OTHER PUBLICATIONS

Supplementary European Search Report issued Mar. 20, 2015 in corresponding European Patent Application Serial No. 12850245 (seven pages).
(Continued)

*Primary Examiner* — Monica Huson
(74) *Attorney, Agent, or Firm* — Harness, Dickey & Pierce, PLC

(57) ABSTRACT

A system for forming a container from a preform includes a first mold operable to receive the preform and operable to blow mold a first form of the container from the preform. The system also includes a second mold operable to receive the first form and operable to blow mold a second form of the container from the first form. The preform, the first form, and the second form each include a substantially common transitional wall. Also, the first form can include various features that ensure that material will be distributed as desired throughout the container, to ensure high wall strength, and to ensure high crystallinity.

14 Claims, 7 Drawing Sheets

(51) Int. Cl.
*B29C 49/12* (2006.01)
*B29B 11/14* (2006.01)
*B29L 31/00* (2006.01)
*B29C 49/06* (2006.01)
*B29B 11/06* (2006.01)
*B29B 11/08* (2006.01)
*B29B 11/10* (2006.01)
*B29C 49/48* (2006.01)

(52) U.S. Cl.
CPC ............... *B29B 11/08* (2013.01); *B29B 11/10* (2013.01); *B29B 11/14* (2013.01); *B29B 2911/1444* (2013.01); *B29B 2911/14333* (2013.01); *B29B 2911/14366* (2013.01); *B29B 2911/14386* (2013.01); *B29B 2911/14426* (2013.01); *B29B 2911/14486* (2013.01); *B29C 49/06* (2013.01); *B29C 49/48* (2013.01); *B29C 2049/1219* (2013.01); *B29C 2049/1238* (2013.01); *B29C 2049/4843* (2013.01); *B29C 2791/001* (2013.01); *B29C 2793/009* (2013.01); *B29C 2793/0027* (2013.01); *B29K 2995/0043* (2013.01); *B29L 2031/716* (2013.01); *B29L 2031/7158* (2013.01)

(56) References Cited

U.S. PATENT DOCUMENTS

| | | | |
|---|---|---|---|
| 4,118,452 A | | 10/1978 | Myers et al. |
| 4,177,239 A | * | 12/1979 | Gittner .................. B29C 49/08 264/529 |
| 6,228,317 B1 | * | 5/2001 | Smith .................. B65D 1/0223 264/521 |
| 2005/0140036 A1 | * | 6/2005 | Hirota .................. B65D 1/0223 264/40.1 |
| 2007/0145646 A1 | | 6/2007 | Cho |

FOREIGN PATENT DOCUMENTS

| | | |
|---|---|---|
| JP | 07-314540 A | 12/1995 |
| JP | 2001-206336 A | 7/2001 |
| JP | 2007-083599 A | 4/2007 |
| WO | WO-2011-092985 A1 | 8/2011 |

OTHER PUBLICATIONS

International Search Report and Written Opinion for PCT/US2012/064785, mailed Mar. 27, 2013; ISA/KR.

* cited by examiner

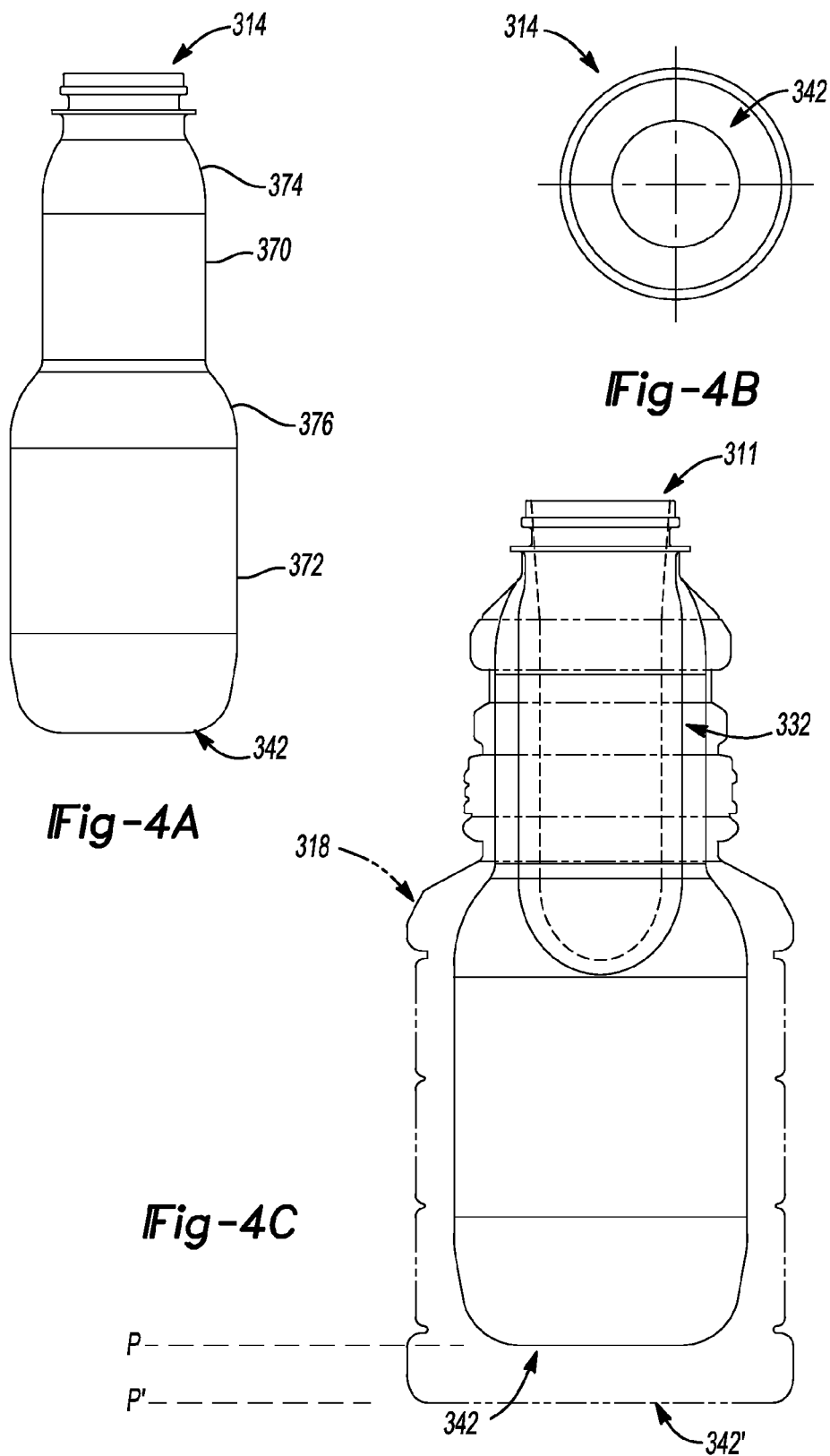

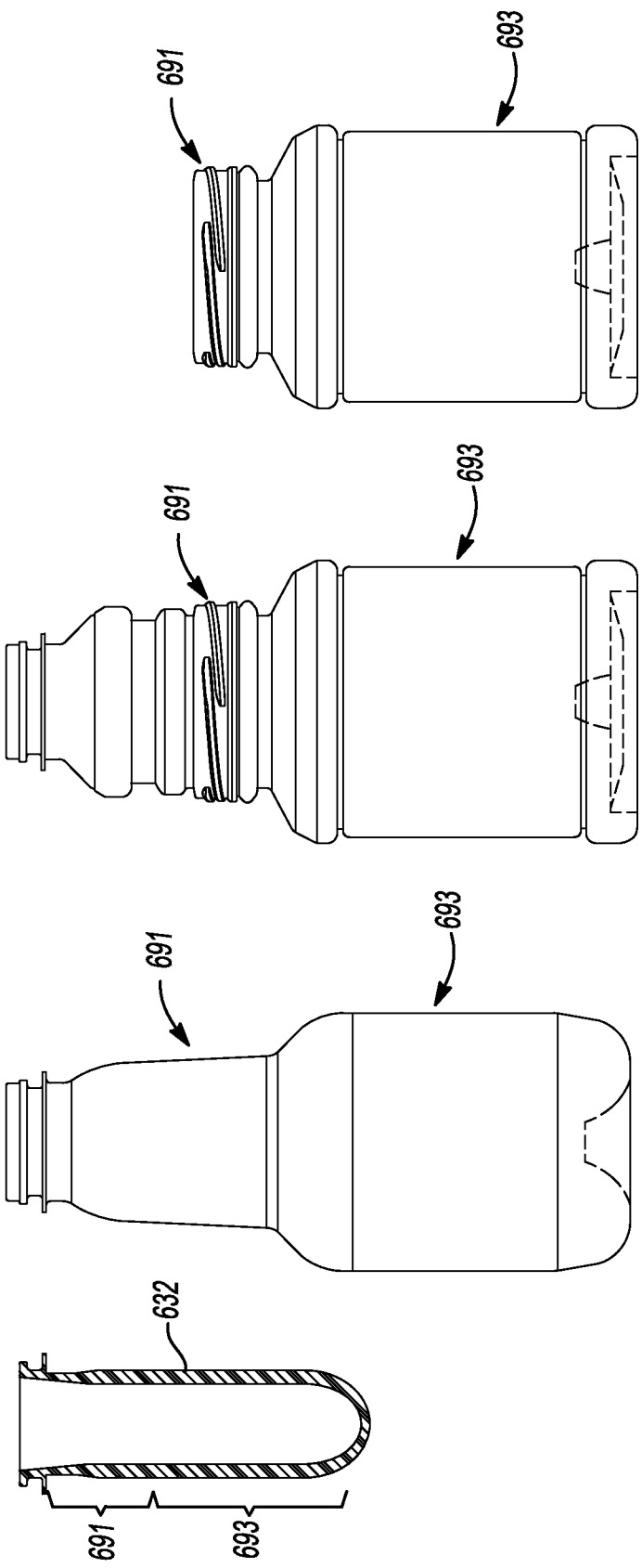

CONTAINER FORMED VIA PLURAL BLOW MOLDING

CROSS-REFERENCE TO RELATED APPLICATIONS

This application claims the benefit of U.S. Provisional Application No. 61/560,110, filed on Nov. 15, 2011. The entire disclosure of the above application is incorporated herein by reference.

FIELD

This disclosure generally relates to a container and, more particularly, relates to a container formed via plural blow molding processes.

BACKGROUND

This section provides background information related to the present disclosure which is not necessarily prior art.

As a result of environmental and other concerns, plastic containers (more specifically polyester and even more specifically polyethylene terephthalate (PET) containers) are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material, $\rho_a$ is the density of pure amorphous PET material (1.333 g/cc), and $\rho_c$ is the density of pure crystalline material (1.455 g/cc). Once a container has been blown, a commodity may be filled into the container.

SUMMARY

This section provides a general summary of the disclosure, and is not a comprehensive disclosure of its full scope or all of its features.

A system for forming a container from a preform is disclosed. The system includes a first mold operable to receive the preform and operable to blow mold a first form of the container from the preform. The system also includes a second mold operable to receive the first form and operable to blow mold a second form of the container from the first form. The preform, the first form, and the second form each include a substantially common transitional wall. Also, the first form can include various features that ensure that material will be distributed as desired throughout the container, to ensure high wall strength, and to ensure high crystallinity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
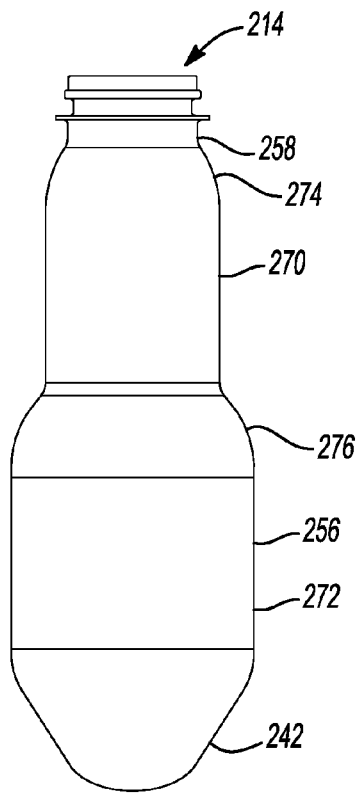
Figure 3B:
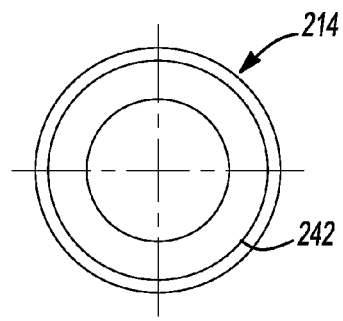
Figure 3C:
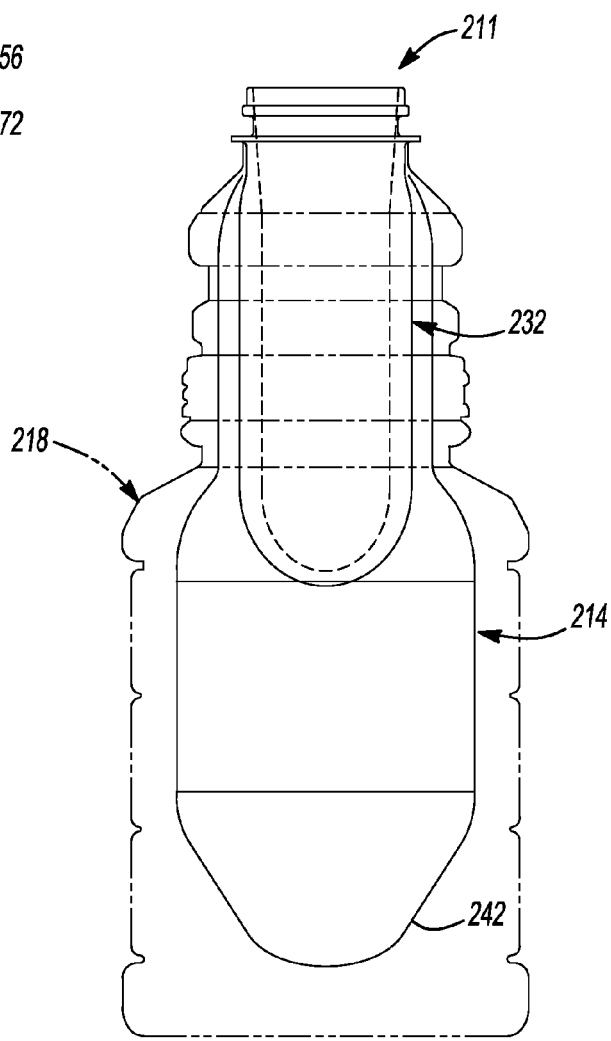
Figure 5A:
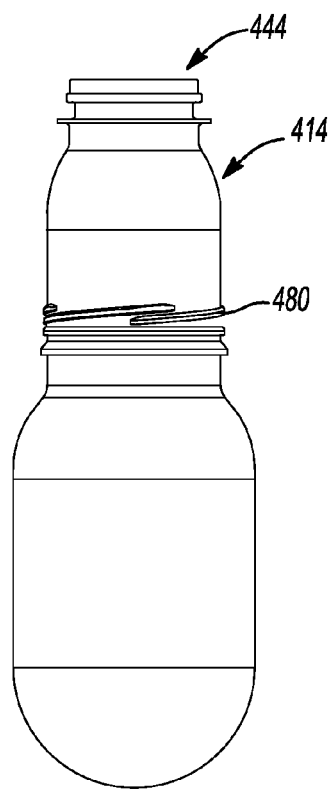
Figure 5B:
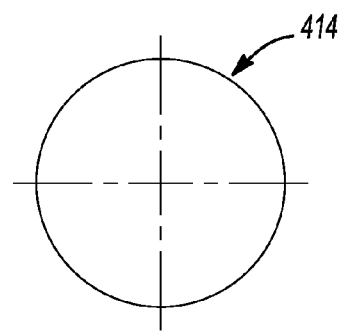
Figure 5C:
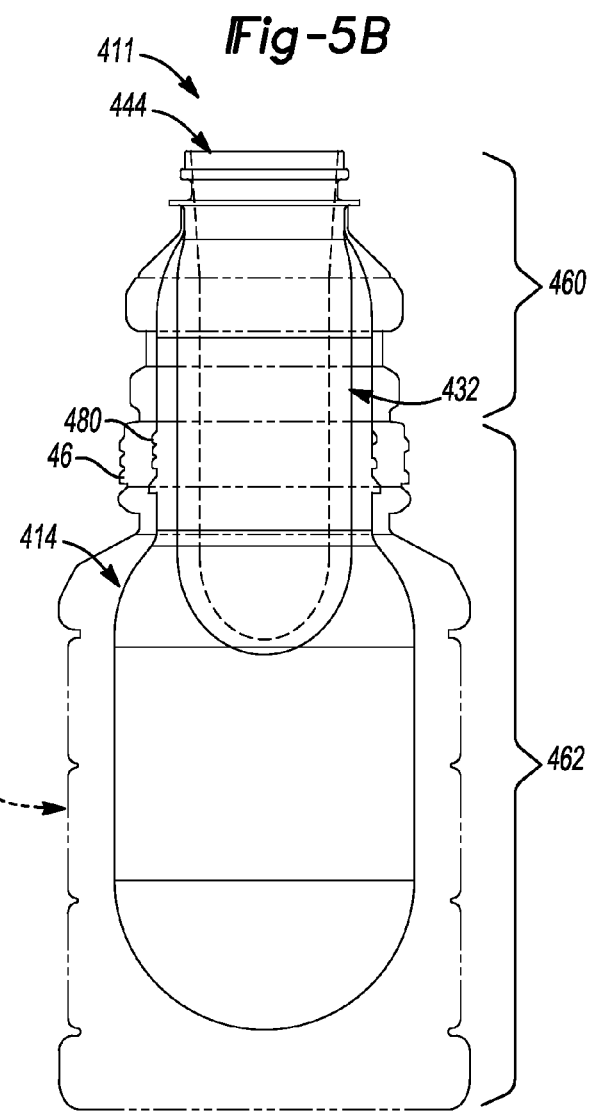
Figure 6A:
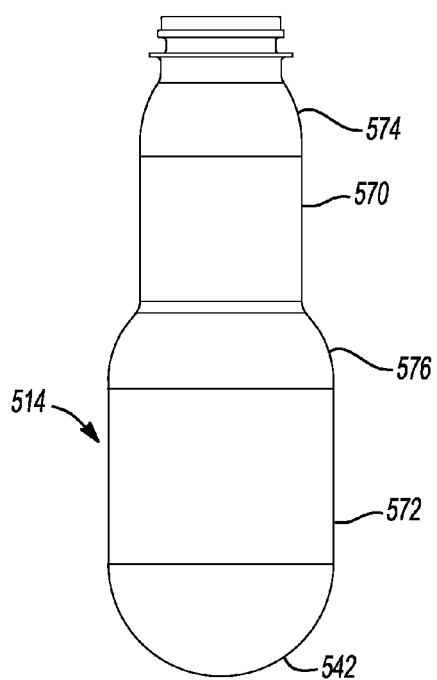
Figure 6B:
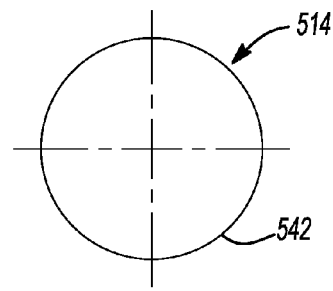
Figure 6C:
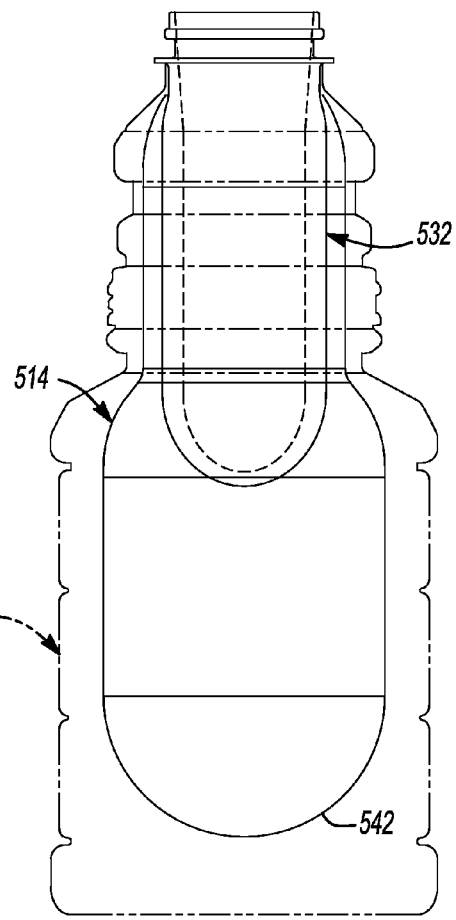

FIGS. 3A, 3B, and 3C include a side view, a bottom view, and an overlaid side view of forms of the container according to additional embodiments of the present disclosure;

FIGS. 4A, 4B, and 4C include a side view, a bottom view, and an overlaid side view of forms of the container according to additional embodiments of the present disclosure;

FIGS. 5A, 5B, and 5C include a side view, a bottom view, and an overlaid side view of forms of the container according to additional embodiments of the present disclosure;

FIGS. 6A, 6B, and 6C include a side view, a bottom view, and an overlaid side view of forms of the container according to additional embodiments of the present disclosure; and FIGS. 7A-7D include side views of the container according to additional embodiments of the present disclosure.

Corresponding reference numerals indicate corresponding parts throughout the several views of the drawings.

DETAILED DESCRIPTION

Example embodiments will now be described more fully with reference to the accompanying drawings.

Figure 1:
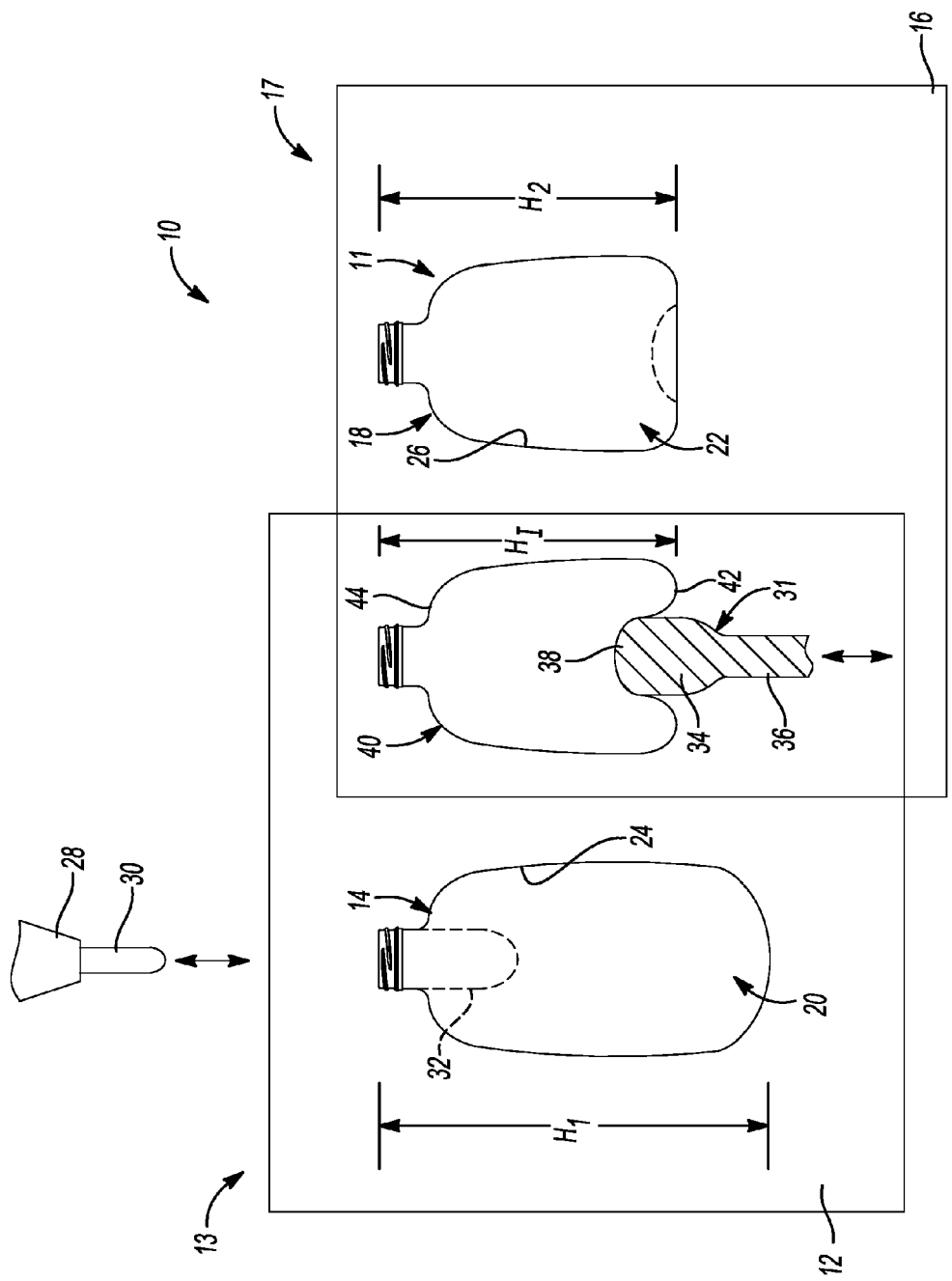
FIG. 1 is a schematic illustration of a plural blow molding system according to exemplary embodiments of the present disclosure.

Referring initially to FIG. 1, a molding system 10 is schematically illustrated according to exemplary embodiments of the present disclosure. As will be discussed, the system 10 can be used for forming a container 11 through a plurality of blow molding steps. The container 11 can be made of PET or another suitable material. In the embodiments illustrated, there can be two blow molding steps (i.e., double blow molding); however, there can be any number of blow molding steps without departing from the scope of the present disclosure.

The container 11 can have any suitable size and shape (e.g., approximately twenty-four ounce capacity). Also, the container 11 can be operable for hot filling, pasteurization, and/or retort processes. The plural molding operations can be designed to ensure that material of the container 11 is distributed in a desirable fashion, such that the container 11 has adequate crystallinity, such that the container 10 has adequate structural integrity, etc.

As shown, the molding system 10 can generally include a first station 13 having a first mold 12 for blow molding and formation of a first form 14 (i.e. primary article) of the container 11. The system 10 can also include a second station 17 having a second mold 16 for blow molding and formation of a second form 18 (i.e., a secondary article) of the container 11. In the embodiments illustrated, the second form 18 is the final form of the container 11 (i.e., no further blow molding occurs); however, in other embodiments, the second form 18 can be further blow molded to form the container 11.

The first and second molds 12, 16 are represented schematically in FIG. 1 as individual squares. The molds 12, 16 are shown overlapping for purposes that will be discussed below. It will be appreciated that the first mold 12 can include a plurality of mold portions that cooperate to define inner surfaces 24 of an internal cavity 20. Also, it will be appreciated that the second mold 16 can include a plurality of mold portions that cooperate to define inner surfaces 26 of an internal cavity 22. The shape of the first form 14 can correspond to the shape of the inner surfaces 24 of the internal cavity 20, and the shape of the second form 18 can correspond to the shape of the inner surfaces 26 of the internal cavity 22. The cavities 20, 22 can have any suitable shape for blow molding the first and second forms 14, 18 as desired.

The system 10 can further include one or more blow nozzles 28. The blow nozzle 28 can be of a known type that introduces a fluid (air) into the first mold 12 to create the first form 14. The blow nozzle 28 can also subsequently introduce fluid into the second mold 16 to create the second form 18. In some embodiments, the same blow nozzle 28 forms the first form 14 and the second form 18, but in other embodiments, there are individual blow nozzles 28 that form the first and second forms 14, 18.

The system 10 can additionally include a stretch rod 30. The stretch rod 30 can be of a known type and can be moveably attached to the blow nozzle 28. Specifically, the stretch rod 30 can move linearly toward and away from the blow nozzle 28 and into and out of the first and/or second molds 12, 16 during formation of the first form 14 and/or formation of the second form 18 as will be discussed in greater detail.

Furthermore, the system 10 can include a counter stretch rod 31. The counter stretch rod 31 can be of a known type with an enlarged head 34 and a shaft 36 extending away from the head 34. The head 34 can also include a terminal end surface 38 that faces away from the shaft 36. The counter stretch rod 31 can move inside either the first mold 12 or the second mold 16. (FIG. 1 shows the counter stretch rod 31 inside the overlapping area of the boxes representing the first and second molds 12, 16 to illustrate that the counter stretch rod 31 can move inside either the first mold 12 or the second mold 16.) Specifically, the counter stretch rod 31 can move linearly (e.g., up and down) within the internal cavity 20, 22 of the respective mold 12, 16. In other embodiments, the counter stretch rod 31 can be located outside the first and second molds 12, 16.

As will be discussed, the counter stretch rod 31 can be used to reduce a first height $H_1$ of the first form 14. Specifically, the counter stretch rod 31 can push a base 42 of the first form 14 toward an upper end 44 of the first form 14 to reduce the first height $H_1$ and form an intermediate form 40 having an intermediate height $H_1$. Then, the intermediate form 40 can be loaded inside the second mold 16 to form the second form 18 to a second height $H_2$. As shown in FIG. 1, the second height $H_2$ can be less than the first height $H_1$, and the intermediate height $H_1$ can be less than the second height $H_2$.

Manufacture of the container 11 will now be discussed in greater detail. To form the container 11, a preform 32 (shown in phantom in FIG. 1) can be positioned inside the first mold 12. Then, the blow nozzle 28 can operably couple to the preform 32 and/or the first mold 12, and the stretch rod 30 can actuate into the preform 32 to stretch the preform 32 within the first mold 12. Next, the blow nozzle 28 can supply fluid (air) into the preform 32 to propel the material of the preform 32 against the inner surface 24 of the first mold 12 to create the first form 14. Heat can be transferred to the first form 14 and/or the second form 14 can be held for a predetermined time inside the first mold 12 to ensure proper crystallinity of the first form 14. As described, the first form 14 can be stretch blow molded from the preform 32. However, the first form 14 can be created via extrusion blow molding, injection blow molding, or in any other manner without departing from the scope of the present disclosure.

Next, the counter stretch rod 31 can actuate to push the base 42 of the first form 14 toward the upper end 44 to reduce the height $H_1$ to the intermediate height $H_1$. As mentioned above, the counter stretch rod 31 can be used inside the first mold 12; therefore, the counter stretch rod 31 can shorten the intermediate form 40 such that the intermediate form 40 fits within the second mold 16. Also, as mentioned above, the counter stretch rod 31 can be used inside the second mold 16. In these embodiments, the counter stretch rod 31 can be used before the second mold 16 is fully closed to ensure that the intermediate form 40 fits within the second mold 16 when closed.

Assuming that the intermediate form 40 is still in the first mold 12, the first mold 12 can be opened such that the intermediate form 40 can be moved from the first mold 12 to the second mold 16. Once the intermediate form 40 is positioned therein, the second mold 16 can be closed for forming the second form 18. Alternatively, assuming that the counter stretch rod 31 is used in the second mold 16, the first form 14 can be removed from the first mold 14, placed within the open second mold 16, and the counter stretch rod 31 can be actuated to form the intermediate form 40. Then, the second mold 16 can be closed for forming the second form 18.

Specifically, the blow nozzle 28 can provide pressurized fluid (air) into the intermediate form 40 to propel the material of the intermediate form 40 against the inner surfaces 26 of the second mold 16 to create the second form 18. Heat can be transferred to the second form 18 and/or the second form 18 can be held for a predetermined time inside the second mold 16 to ensure proper crystallinity of the second form 18. Then, the second form 18 can be removed from the second mold 16, and the second form 18 can be processed further (e.g., can be labeled or otherwise marked, etc.) for completing the container 11. Then, the container 11 can be filled with a commodity (not shown). A cap (not shown) or other closure can also be attached to the container 11 to thereby seal the commodity therein.

Figure 2A:
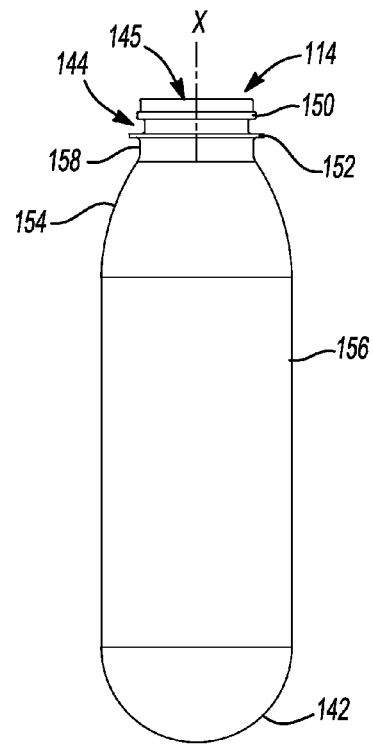
FIG. 2A is a side view of a first form of a container created using the blow molding system of FIG. 1.
Figure 2B:
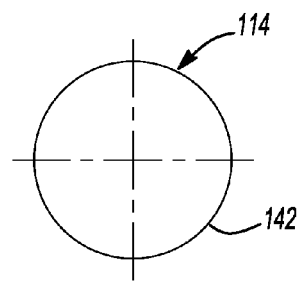
FIG. 2B is a bottom view of the first form of FIG. 2A.
Figure 2C:
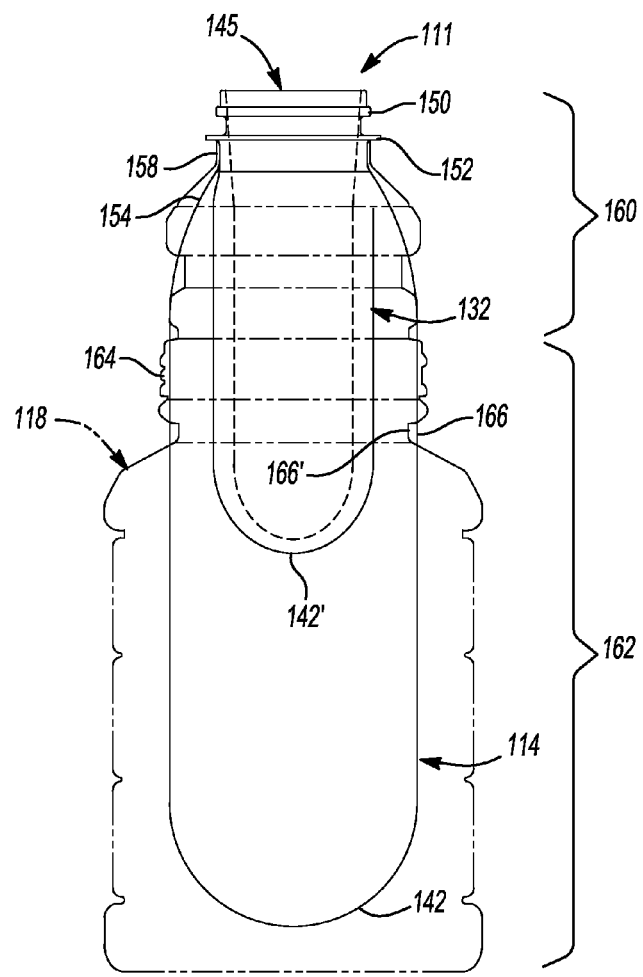
FIG. 2C is a side view of the first form of FIG. 2A laid over a perform and a second form of the container according to exemplary embodiments of the present disclosure.

Referring now to FIGS. 2A-2C, additional embodiments of the perform 132, the first form 114, and the second form 118 will be discussed in greater detail. Components corresponding to those of FIG. 1 are indicated with corresponding reference numbers increased by 100. Also, the dimensions (shown in inches and corresponding millimeters) are merely exemplary embodiments of the present disclosure, and the dimensions can vary without departing from the scope of the present disclosure.

As shown, the first form 114 (shown in FIGS. 2A-2C) can be generally tubular. The base 142 can be convex and can close off the first form 114. The upper end 144 can include an opening 145 into the first form 114, an upper finish 150, a retaining ring 152 below the upper finish 150, sidewall 156 that extends between the upper finish 150 and the base 142. The side wall 156 can include a shoulder 154 below the retaining ring 152 that tapers radially outward to transition to a substantially constant diameter portion of the sidewall 156. The side wall 156 can extend continuously from the shoulder 154 to the convex base 142.

Moreover, a transition 158 can be defined between the retaining ring 152 and the shoulder 154. The transition 158 can be relatively short and can be substantially parallel to the longitudinal axis X of the first form 114 (i.e., the transition 158 can have a relatively low slope). As shown in FIG. 2C, the transition 158 (transitional wall) can be substantially common to each of the preform 132, the first form 114, and the second form 118 (i.e., the length and slope of the transition 158 changes very little, if at all, during the double blow molding process). Because the transition 158 is intended to stay substantially constant during the blow molding process, the material of the container 111 is likely to be distributed throughout in a desired manner (e.g., the material is unlikely to "lock up" at the transition 158).

Moreover, in comparing the first form 114 to the preform 132, the first form 114 can be shaped substantially similar, except that the first form 114 can be longer and can have a larger diameter than the preform 132. Additionally, a base 142' of the preform 132 and the base 142 of the first form 142 can be substantially convex. Also, the shoulder 154 can be included on the first form 114 whereas the preform 132 may not have a shoulder.

Furthermore, as shown in FIG. 2C, the second form 118 can include a defined trim portion 160 and a main body 162. The trim portion 160 can be removed from the main body 162 and discarded after the second form 118 is made. The second portion 118 can additionally include a threaded finish 164 that is formed by blow molding the second portion 118 (i.e., the finish 164 is not included on the first form 114). Additionally, the second form 118 can have a greater height (measured parallel to the axis X) than the first form 114.

Moreover, one or more regions 166 of the first form 114 can have a wider diameter than a corresponding region 166' of the second form 118. The regions 166, 166' can be substantially the same distance away from the upper end 144. In these embodiments, the first form 114 can spring back while inside the first mold 14 such that the first form 114 can fit within the second mold 18. The spring back can be between 5% and 20% of its diameter at the region 166.

Referring now to FIGS. 3A-3C, additional embodiments of the preform 232, the first form 214, and the second form 218 will be discussed in greater detail. Components corresponding to those of FIG. 1 are indicated with corresponding reference numbers increased by 200. Also, the dimensions (shown in inches and corresponding millimeters) are merely exemplary embodiments of the present disclosure, and the dimensions can vary without departing from the scope of the present disclosure.

As shown, the first form 214 can have a base 242 that is frustoconic in shape. Also, the side wall 256 can include a smaller diameter portion 270 and a larger diameter portion 272. The side wall 256 can also include an upper shoulder 274 that tapers outward from the transition 258 to the smaller diameter portion 270, and a middle shoulder 276 that tapers outward from the smaller diameter portion 270 to the larger diameter portion 272.

Referring now to FIGS. 4A-4C, additional embodiments of the preform 332, the first form 314, and the second form 318 will be discussed in greater detail. Components corresponding to those of FIG. 1 are indicated with corresponding reference numbers increased by 300. Also, the dimensions (shown in inches and corresponding millimeters) are merely exemplary embodiments of the present disclosure, and the dimensions can vary without departing from the scope of the present disclosure.

As shown, at least a portion of the base 342 of the first form 314 can lie within a common plane P. As shown in FIG. 4C, the plane P can be substantially parallel to a plane P' defined by the base 342' of the second form 318. Also, the first form 314 can include the shoulders 374, 376 described above with relation to the embodiments of FIG. 3A.

Referring now to FIGS. 5A-5C, additional embodiments of the perform 432, the first form 414, and the second form 418 will be discussed in greater detail. Components corresponding to those of FIG. 1 are indicated with corresponding reference numbers increased by 400. Also, the dimensions (shown in inches and corresponding millimeters) are merely exemplary embodiments of the present disclosure, and the dimensions can vary without departing from the scope of the present disclosure.

In the embodiments illustrated, the first form 414 can include a first threading 480, and the second form 418 can include a second threading 464 that is blow molded from the first threading 480. More specifically, the first threading 480 and the second threading 464 can each be disposed at generally the same distance away from the upper end 444 of the container 411. The first threading 480 can have a smaller diameter than the second threading 464. When the second form 418 is blown from the first form 414, the first threading 480 can be expanded and widened to have a larger diameter and to define the second threading 464. The second form 418 can define a trim portion 460 and a main body portion 462. The second threading 464 can be disposed on the main body portion 462, just below the trim portion 460, such that the second threading 464 can define a threaded finish for the container 411 (after the trim portion 460 is removed from the main body portion 462). Thus, the second threading 464 can be formed in an efficient, accurate, and repeatable manner.

Referring now to FIGS. 6A-6C, additional embodiments of the perform 532, the first form 514, and the second form 518 will be discussed in greater detail. Components corresponding to those of FIG. 1 are indicated with corresponding reference numbers increased by 500. Also, the dimensions (shown in inches and corresponding millimeters) are merely exemplary embodiments of the present disclosure, and the dimensions can vary without departing from the scope of the present disclosure.

The first form 514 can be substantially similar to the first form 414 of FIGS. 5A-5C. Thus, the first form 514 can include a convex base 542. The first form 514 can also include the shoulders 574, 576 discussed above. Also, in comparing the first form 514 of FIGS. 6A-6C to the first form 114 of FIGS. 2A-2C, the largest diameter of the first form 514 can be smaller (e.g., approximately 10% smaller) than the largest diameter of the first form 114.

The preforms 132, 232, 332, 432, 532 illustrated in FIGS. 2C, 3C, 4C, 5C, and 6C can be substantially similar to each other. Also, the second forms 118, 218, 318, 418, 518 illustrated in FIGS. 2C, 3C, 4C, 5C, 6C can be substantially similar to each other. However, as shown in FIGS. 2A-6C, the first forms 114, 214, 314, 414, 514 can be tailored in various ways such that the blow molding operations produce desired material distribution, wall strength, crystallinity, etc. It will be appreciated that the features of the first forms 114, 214, 314, 414, 514 can be combined into additional first forms as well.

Referring to FIGS. 7A-7D, additional embodiments will be discussed. Specifically, in FIG. 7A, a preform 632 is provided. The preform 632 includes a finish forming region 691 and a body forming region 693 disposed below the finish forming region 691. The finish forming region 691 is generally a section of preform 632 that will be formed into the finish of the final container. The body forming region 693 is generally a section of the preform 632 that will be formed into the body of the final container. The preform 632 will be shaped from a preform (FIG. 7A) to a primary article (FIG. 7B) to an intermediate article (FIG. 7C) to a final container (FIG. 7D). Any one of the features of the preform, the primary article, the intermediate article, and/or final container can be included in the containers discussed above in relation to FIGS. 1-6C. Also, the disclosure of U.S. Provisional Patent Application No. 61/468,748 are incorporated by reference in its entirety.

In some embodiments, the diameter of the finish forming region 691 of the primary article (FIG. 7B) is limited to about 15% to 50% greater than the diameter of finish forming region 691 of preform 632 (FIG. 7A) and more preferably about 20% to 40% greater. The diameter of the body forming region 693 of primary article (FIG. 7B) is 2 to 3 times greater than the diameter of preform 632 (FIG. 7A) as measured in the body forming region 693 of preform 632. Accordingly, the primary article (FIG. 7B) has a diameter ratio of body forming region 693 of primary article (FIG. 7B) to finish forming region 691 of primary article (FIG. 7B) that is in the range of 1.3:1 to 2.5:1.

This results in a primary article (FIG. 7B) wherein the finish forming region 691 is thicker and less oriented than the body forming region 693. Due to this, the finish forming region 691 retains more heat and contains more amorphous material than does the body forming region 693. This will result in higher levels of formation of heat-induced, or spherulitic crystallinity, in the finish forming region 691 of the primary article (FIG. 7B) during the reconditioning stage given the retained heat and higher level of amorphous material available to support formation of spherulitic crystals.

Given the fact that the diameter of the body forming region 693 of primary article (FIG. 7B) is at least 2 to 3 times greater than the corresponding preform 632 diameter, this results in a thinner wall and higher levels of orientation and stretch-induced crystallinity in this region, particularly as compared to that of the finish forming region 691 as described above. Therefore, this body forming region 693 can shrink back becoming thermally relaxed during the reconditioning stage, but will not result in high levels of spherulitic crystal formation as occurs in the finish forming region 691. This is due to the fact that there is not the level of retained heat and amorphous material available in the body forming region 693 to support high levels of spherulitic crystallization during reconditioning.

The above factors will enable formation of a final container with a finish having high levels of heat-induced spherulitic crystallinity, which is preferred for maintaining seal integrity and limiting finish shrinkage during subsequent filling and/or heat processing. Conversely, the body portion of the final container (FIG. 7D) will have high levels of orientation and stretch-induced crystallinity with low levels of residual stresses as a result of the double-blow process.

The present teachings provide a number of advantages, such as the average wall thickness and diameter of the preform 632 (FIG. 7A) is fairly consistent along its vertical extent in both the finish forming region 691 and body forming region 693. Moreover, the diameter of the finish of final container (FIG. 7D) ranges from about 10% to 30% greater than the diameter of the finish forming region 691 of the primary article (FIG. 7B). The diameter of the body forming region 693 of the primary article (FIG. 7B) is 2 to 3.5 times greater than diameter of preform 632 (FIG. 7A) as measured in the body forming region 693 of preform 632. This results in a primary article (FIG. 7A) having a diameter ratio of body of primary article (FIG. 7B) to neck portion of primary article (FIG. 7B) is in the range of 1.3:1 to 2.5:1. In some embodiments, the diameter of the finish forming region 691 of primary article (FIG. 7B) is limited to about 15% to 50% greater than the diameter of finish forming region 691 of preform (FIG. 7A) and more preferably 20% to 40%. In some embodiments, the finish diameter of the final container (FIG. 7D) is between 10% less than and 10% greater than finish forming region 691 of the primary article (FIG. 7B). In some embodiments, the finish of the final container (FIG. 7D) will have a higher level of heat-induced, spherulitic crystallinity than that of the sidewall of the final container. In some embodiments, the sidewall of final container (FIG. 7D) will have higher levels of orientation & stretch-induced crystallinity than exists in the finish. It is anticipated that in some embodiment the overall crystallinity and/or density will be greater in the finish region of final container (FIG. 7D) than that of the container body and base regions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a container comprising:
   positioning a preform of the container into a first blow mold;
   blow molding a first form of the container from the preform; and
   blow molding a second form of the container from the first form, wherein the preform, the first form and the second form each include a substantially common transitional wall, wherein
   the preform, the first form and the second form each include an upper end with an opening into the container, a base that closes off the container, a finish that is adjacent the upper end, and a sidewall that extends from the finish toward the base, the transition wall being disposed between the finish and the sidewall,
   the base of the preform and the base of the first form are substantially convex, and
   the first form of the container defines a first diameter and the second form of the container defines a second diameter, the first diameter being approximately 10% smaller than the second diameter.

2. The method of claim 1, wherein the first form of the container includes a first threading, and the second form of the container includes a second finish with a second threading, and wherein blow molding a second form of the container from the first form includes forming the second threading from the first threading.

3. The method of claim 1, wherein the base of the first form and the base of the second form are substantially planar.

4. The method of claim 3, wherein the first form has a smaller height than the second form.

5. The method of claim 1, wherein first form includes a base that is frustoconic.

6. The method of claim 1, wherein the first form defines a first diameter at a first distance away from the first form upper end, wherein the second form defines a second diameter at a second distance away from the second form upper end, the first and second distances being substantially equal, the second diameter being larger than the first diameter.

7. A method of forming a container comprising:
   positioning a preform of the container into a first blow mold;
   blow molding a first form of the container from the preform; and blow molding a second form of the container from the first form, wherein the preform, the first form and the second form each include a substantially common transitional wall, wherein the first form defines a first upper end and the second form defines a second upper end, wherein the first form defines a first diameter at a first distance away from the first upper end, wherein the second form defines a second diameter at a second distance away from the second upper end, the first and second distances being substantially equal, the second diameter being larger than the first diameter.

8. The method of claim 7, wherein the preform, the first form and the second form each include an upper end with an opening into the container, a base that closes off the container, a finish that is adjacent the upper end, and a sidewall that extends from the finish toward the base, the transition being disposed between the finish and the sidewall.

9. The method of claim 8, wherein the base of the preform and the base of the first form are substantially convex.

10. The method of claim 9, wherein the first form of the container defines a first diameter and the second form of the container defines a second diameter, the first diameter being approximately 10% smaller than the second diameter.

11. The method of claim 7, wherein the first form of the container includes a first threading, and the second form of the container includes a second finish with a second threading, and wherein blow molding a second form of the container from the first form includes forming the second threading from the first threading.

12. The method of claim 7, wherein the first form and the second form each include a base, and wherein the base of the first form and the base of the second form are substantially planar.

13. The method of claim 12, wherein the first form has a smaller height than the second form.

14. The method of claim 7, wherein first form includes a base that is frustoconic.

\* \* \* \* \*